United States Patent
Kunimi et al.

(10) Patent No.: US 6,353,782 B1
(45) Date of Patent: Mar. 5, 2002

(54) AUXILIARY ACCELERATION SENSOR DEVICE FOR AN AIR BAG SYSTEM

(75) Inventors: Takashi Kunimi; Masahiro Nezu; Masatomo Mori; Kazuya Kato, all of Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/323,930

(22) Filed: Jun. 2, 1999

(30) Foreign Application Priority Data

Jun. 2, 1998 (JP) .......................................... 10-152924

(51) Int. Cl.$^7$ ............................................. B60R 21/32
(52) U.S. Cl. ..................... 701/45; 307/9.1; 307/121; 307/10.1; 701/45; 280/735
(58) Field of Search ..................... 307/10.1, 47, 121, 307/9.1; 701/45, 46; 280/728.1, 728.2, 734, 735

(56) References Cited

U.S. PATENT DOCUMENTS

| | | | |
|---|---|---|---|
| 4,166,641 A | * 9/1979 | Okada et al. ............... 280/735 |
| 4,836,024 A | * 6/1989 | Woehrl et al. ............. 307/10.1 |
| 5,173,614 A | * 12/1992 | Woehrl et al ............. 307/10.1 |
| 5,337,238 A | * 8/1994 | Gioustos et al ............... 701/47 |
| 5,440,485 A | * 8/1995 | Okimoto et al. .............. 701/46 |
| 5,483,447 A | * 1/1996 | Jeenicke et al. ............. 701/45 |
| 5,555,174 A | * 9/1996 | Okimoto ..................... 701/46 |
| 5,609,358 A | * 3/1997 | Iyoda et al ................. 280/735 |
| 5,631,594 A | * 5/1997 | Kimura ....................... 327/351 |
| 5,758,301 A | * 5/1998 | Saito et al ..................... 701/45 |
| 5,788,273 A | * 8/1998 | Jeenicke et al. ............ 280/735 |
| 5,961,562 A | * 10/1999 | Iyoda .......................... 701/45 |
| 6,005,479 A | * 12/1999 | Ide .............................. 340/438 |
| 6,018,980 A | * 2/2000 | Kimura et al. ............... 73/12.4 |
| 6,070,113 A | * 5/2000 | White et al. .................. 701/45 |
| 6,167,335 A | * 12/2000 | Ide et al. ....................... 701/45 |
| 6,249,730 B1 | * 6/2001 | Khairallah et al. ........... 701/45 |
| 6,271,747 B1 | * 8/2001 | Fendt et al. ................. 340/436 |

FOREIGN PATENT DOCUMENTS

| | | |
|---|---|---|
| JP | 5-23141 | 3/1993 |
| JP | 8-5077 | 2/1996 |

* cited by examiner

*Primary Examiner*—Josie Ballato
*Assistant Examiner*—Robert L. Deberadinis
(74) *Attorney, Agent, or Firm*—Morgan, Lewis & Bockius LLP (57) ABSTRACT

To improve a response rate and an impact detection precision of an auxiliary acceleration sensor device for an air bag system, an auxiliary acceleration sensor device includes a longitudinal G sensor for sensing a longitudinal acceleration G of a vehicle, and lateral G sensor for sensing a lateral acceleration G of the vehicle. The longitudinal G sensor includes a constant current source circuit, a detector portion for outputting an electrical signal representative of a longitudinal acceleration G, and an amplifier portion for amplifying the signal received from the detecting portion. The comparator includes comparing elements that compare the voltage values corresponding to longitudinal threshold values Tf1 to Tf4 of the longitudinal acceleration G with an output signal of the amplifier portion. Lateral G sensor includes a constant current source circuit, a detector portion for outputting an electrical signal representative of a lateral acceleration G, and an amplifier portion for amplifying the signal received from the detecting portion. Comparator means includes comparing elements which compare the voltages corresponding to lateral threshold values Ts1 to Ts4 of the lateral acceleration G with the output signal of the amplifier portion. An OR circuit coupled for reception with the comparator means outputs a signal to a main controller of an air bag control system when predetermined conditions are satisfied.

18 Claims, 9 Drawing Sheets

AUXILIARY ACCELERATION SENSOR DEVICE FOR AN AIR BAG SYSTEM

This application claims the benefit of Japanese Application No. Hei. 10-152924 filed Jun. 2, 1998, which is hereby incorporated by reference.

BACKGROUND OF THE INVENTION

1. Field of the Invention

The present invention relates to an auxiliary acceleration sensor device for use with an air bag system which is installed in a vehicle such that when the vehicle collides with another, an air bag inflates to protect a driver against any large impact.

2. Discussion of the Related Art

At the time of vehicle collision, a large impact is applied to a vehicle, and a large acceleration is generated in the vehicle. An air bag system installed on the vehicle senses the acceleration by an acceleration sensor and sends an output signal to an inflator, which in turn inflates an air bag. The acceleration sensor for sensing an acceleration of the vehicle is generally located at the central part of the vehicle body. This type of sensor is disclosed in Japanese Utility Model Examined Publication Hei. 8-5077 and Japanese Utility Model Unexamined Publication Hei. 5-23141, for example.

In designing an air bag, which is installed in a steering wheel to protect a driver against the collision impact, the air bag system is designed to operate only when the vehicle receives an impact in the longitudinal direction. The system is inhibited from operating in response to impacts applied in the right and left directions and the back-to-front direction. Thus, additional systems have been proposed to use an auxiliary acceleration sensor that will specify the direction of an impact applied to the vehicle.

A mechanical sensor is used for the auxiliary acceleration sensor of this type. However, the mechanical sensor has a number of disadvantages. For example, the mechanical sensor's response rate is low, and it is likely to mistakenly operate in response to an obliquely applied impact. With the use of the mechanical sensor, the air bag system cannot flexibly control the air bag operation and is not adaptable for various types of vehicle collisions.

Accordingly, an object of the present invention is to provide an auxiliary acceleration sensor device in use with an air bag system, which succeeds in solving the above problems.

SUMMARY OF THE INVENTION

An object of the present invention is to improve response rate and impact detection precision of an auxiliary acceleration sensor device for an air bag system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided an air bag system comprising a main controller that controls operation of an air bag; a main acceleration sensor that senses an acceleration of a vehicle carrying the air bag system; and an auxiliary acceleration sensor device, located at a periphery of the vehicle, that senses an acceleration of the periphery of the vehicle, the auxiliary acceleration sensor device comprising a longitudinal sensor that senses a longitudinal acceleration of the vehicle and generates a longitudinal acceleration signal; a lateral sensor that senses a lateral acceleration of the vehicle and generates a lateral acceleration signal; a first set of comparators that compare the longitudinal acceleration signal with each of a first preselected set of acceleration values and generate a first set of comparator output signals, each of the first set of comparator output signals corresponding to one of the first preselected set of acceleration values; a second set of comparators that compare the lateral acceleration signal with each of a second set of preselected values of acceleration and generate a second set of comparator output signals, each of the second set of comparator output signals corresponding to one of the second preselected set of acceleration values, the first and second set of preselected acceleration values being related by an acceleration discriminating pattern comprising a plurality of areas stepwise arranged, each of the areas being defined by the first and second set of preselected acceleration values; AND elements, each having an AND element output signal, the AND elements logically multiplying each output signal of the first set of comparator output signals with a related output signal of the second set of comparator output signals; and an OR circuit that logically sums the AND element output signals and outputs a result to the main controller.

In another aspect of the present invention, there is provided an air bag system comprising a main controller for controlling an operation of an air bag; a main acceleration sensor for sensing an acceleration of a vehicle carrying the air bag system; and an auxiliary acceleration sensor device, located at a periphery of the vehicle, for sensing an acceleration of the periphery of the vehicle, the auxiliary acceleration sensor device comprising a plurality of series circuits connected in parallel, each series circuit comprising a longitudinal switch being turned on when a detected acceleration reaches a first preselected value defined by one area of an acceleration discriminating pattern; and a lateral switch being turned off when a detected acceleration reaches a second preselected acceleration value defined by one of the areas of the acceleration discriminating pattern, and the acceleration discriminating pattern is defined by related sets of lateral and front-to-rear acceleration values.

In yet another aspect of the present invention, there is provided an air bag system, comprising a main controller for controlling the operation of the air bag; a main acceleration sensor device for sensing an acceleration of a vehicle carrying the air bag system; and an auxiliary acceleration sensor, located at a periphery of the vehicle, for sensing an acceleration of the periphery of the vehicle, the auxiliary sensor device comprising longitudinal sensor means for sensing a longitudinal acceleration of the vehicle, the longitudinal sensor means having an output; lateral sensor means for sensing a lateral acceleration of the vehicle, the lateral sensor means having an output; first and second comparator means each having output signals and operating on the basis of an acceleration discriminating pattern comprising a plurality of areas stepwise arranged, each of the areas being defined by related levels of output signals of the longitudinal sensor means and the lateral sensor means, the first comparator means for determining if a sensed longitudinal acceleration is larger than a predetermined value of acceleration in each area of the acceleration discriminating pattern, the second comparator means for determining if a sensed lateral acceleration is smaller than a predetermined value of acceleration in each area of the acceleration discriminating pattern; an AND circuit, having output signals and comprising a plurality of AND elements, for logically multiplying the output signals of the first comparator means and the second comparator means; and an OR circuit for logically summing the output signals of the AND elements of the AND circuit and outputting a result to the main controller.

In still another aspect of the present invention, there is provided an air bag system comprising a main controller for controlling an operation of an air bag; a main acceleration sensor for sensing an acceleration of a vehicle; and an auxiliary acceleration sensor device, located at a periphery of the vehicle, for sensing an acceleration of the periphery of the vehicle, the auxiliary acceleration sensor device including a plurality of series circuits connected in parallel, each series circuit comprising longitudinal switching means being turned on when a sensed acceleration reaches a first preset acceleration value of each the area of an acceleration discriminating pattern; and lateral switching means being turned off when a sensed acceleration reaches a second preset acceleration value of each the area of the acceleration discriminating pattern.

It is to be understood that both the foregoing general description and the following detailed description are exemplary and explanatory and are intended to provide further explanation of the invention.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
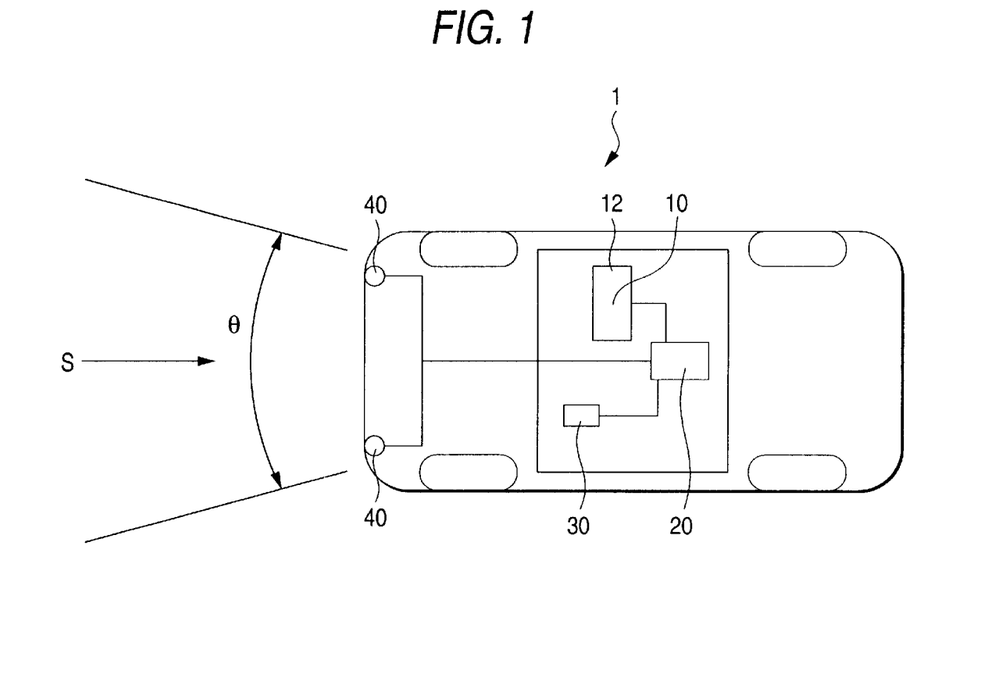
FIG. 1 is a diagram showing an air bag device installed to a vehicle.
Figure 2:
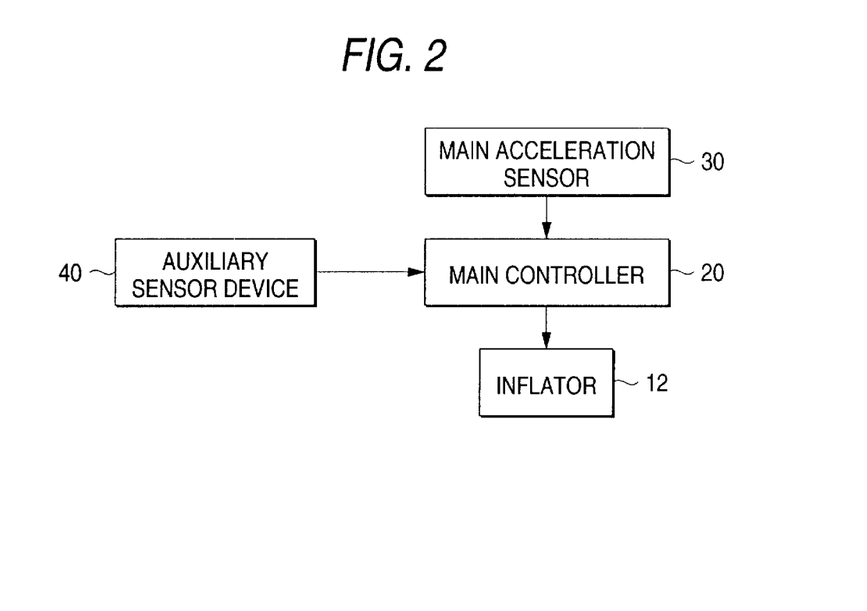
FIG. 2 is a block diagram showing an air bag control system.

FIG. 1 is a diagram showing an air bag device installed on a vehicle. FIG. 2 is a block diagram showing an air bag control system. An air bag 10 and an inflator 12 that generates gas to inflate the air bag are installed in a steering wheel located near a driver seat. A main controller 20 that controls the operation of the air bag is located at an appropriate place in the vehicle, and receives acceleration data from a main acceleration sensor 30. The main acceleration sensor 30 senses acceleration of the vehicle and is located at the central portion of the vehicle.

An auxiliary sensor device 40 is placed at the central part of the front of the vehicle or two auxiliary acceleration sensor devices 40 are placed at both sides of the vehicle front as shown in FIG. 1. When an impact S is applied to the front of the vehicle, an auxiliary sensor 40 senses an acceleration of the vehicle caused by the impact, and sends an output signal to the main controller 20. The air bag, which is installed at the front of the driver seat or the passenger seat in the vehicle, must be designed such that it is operable in response to an impact applied to the front of the vehicle, but is inoperable in response to an impact applied to either of the sides or the rear of the vehicle.

The auxiliary sensor device 40 outputs a signal to the main controller 20 when the following conditions are satisfied: 1) the direction of an impact S applied to the vehicle is within an angular range of an angle θ set up in front of the vehicle (FIGS. 1) and 2) an acceleration of the vehicle caused by the impact S, the direction of which is coincident with a longitudinal direction, is in excess of a predetermined value of acceleration. The main controller 20 processes the output signals of the auxiliary sensor device 40 and the main acceleration sensor 30, and controls the operation of the inflator 12 in accordance with the result of processing those output signals.

Figure 3:
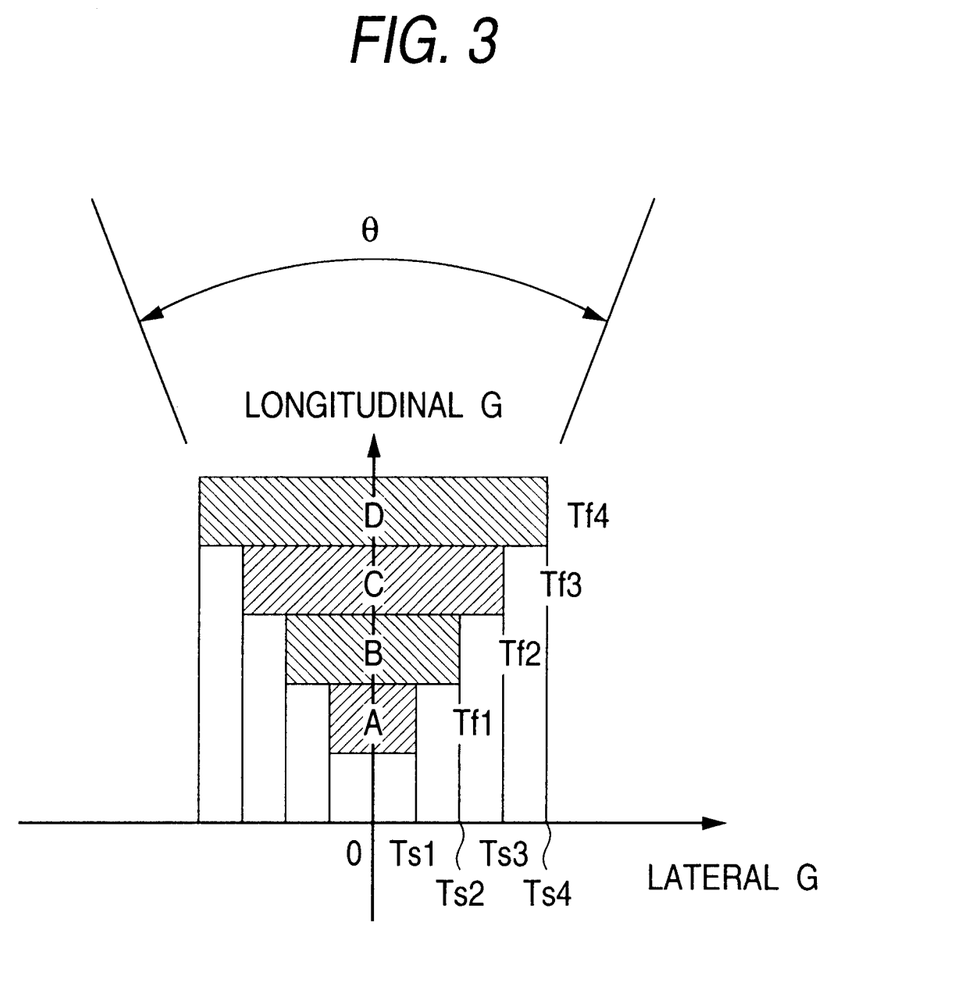
FIG. 3 is a diagram useful in explaining the principle of an auxiliary acceleration sensor device constructed according to the present invention.

FIG. 3 is a diagram useful in explaining the principle of an auxiliary acceleration sensor device constructed according to the present invention. In the auxiliary acceleration sensor device, a magnitude of an acceleration is discriminately detected by use of predetermined threshold values, with the intention of increasing a response rate of the device and simplifying an acceleration detecting circuit. To this end, the auxiliary acceleration sensor device includes a first detecting portion for detecting an acceleration G of the vehicle, the direction of which is coincident with the longitudinal direction, and a second detecting portion for detecting an acceleration of the vehicle, the direction of which is a lateral direction of the vehicle, viz., substantially perpendicular to the longitudinal direction.

As shown in FIG. 3, four acceleration discriminating areas A to D are used for discriminating an acceleration of the vehicle when it receives an impact. In the figure, "Tf" indicates a longitudinal threshold value of an acceleration G, the direction of which is coincident with the longitudinal direction. "Ts" indicates a lateral threshold value of an acceleration G, the direction of which is either of lateral directions (rightward and leftward). Numerals (1 to 4) associated with Tf and Ts are the magnitudes of the threshold values Tf and Ts.

An acceleration discriminating area A is defined by Tf1 or larger and Ts1 or smaller. When sensing the acceleration G within this area, the auxiliary acceleration sensor device judges that the direction of an impact causing the acceleration is within the angular range defined by the angle theta (θ), and sends a signal to the main controller 20. An area B is defined by Tf within a range from Tf1 to Tf2, and Ts2 or smaller. An area C is defined by Tf within a range from Tf2 to Tf3, and Ts3 or smaller. An area D is defined by Tf4 or larger and Ts4 or smaller.

Figure 4:
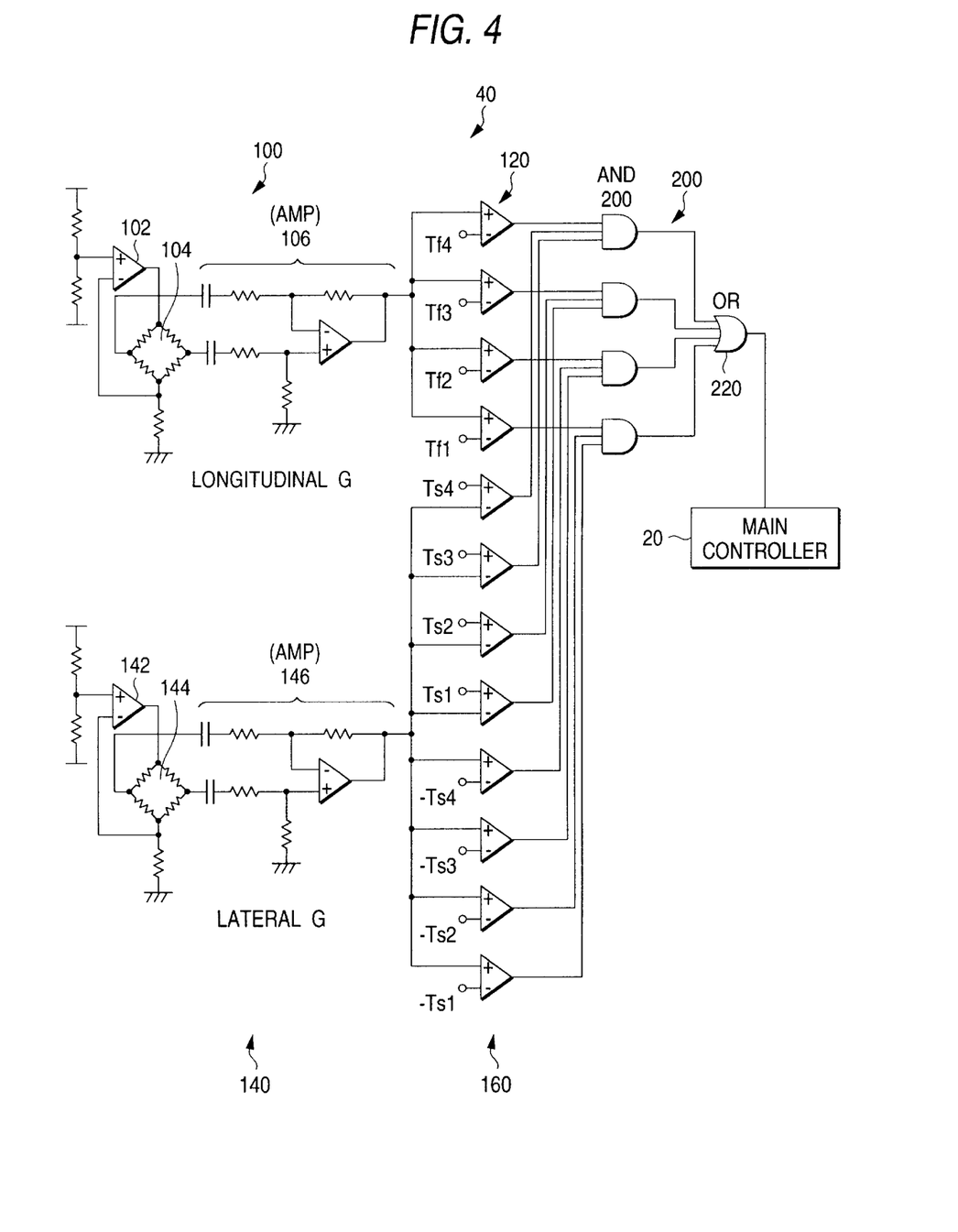
FIG. 4 is a circuit diagram showing an auxiliary acceleration sensor device as an electrical implementation of one embodiment of the present invention.

FIG. 4 is a circuit diagram showing an auxiliary acceleration sensor device as an electrical implementation of one embodiment of the present invention. The auxiliary acceleration sensor device 40 includes longitudinal G sensor 100 for sensing a longitudinal acceleration G of a vehicle, and lateral G sensor 140 for sensing a lateral acceleration G of the vehicle.

The longitudinal G sensor 100 includes a constant current source circuit 102, a detector portion 104 for outputting an electrical signal representative of a longitudinal acceleration G, and an amplifier portion 106 for amplifying the signal received from the detecting portion. Comparator 120 includes comparing elements, and each comparing element compares the voltage corresponding to a longitudinal threshold value Tf (Tf1 to Tf4) of the longitudinal acceleration G with the output signal of the amplifier portion 106.

The lateral G sensor 140 includes a constant current source circuit 142, a detector portion 144 for outputting an electrical signal representative of a lateral acceleration G, and an amplifier portion 146 for amplifying the signal received from the detecting portion. Comparator 160 includes comparing elements, and each comparing element compares the voltage corresponding to a lateral threshold value Ts (Ts1 to Ts4) of the lateral acceleration G with the output signal of the amplifier portion 146.

If the values of the longitudinal acceleration G and the lateral acceleration G are within any of the areas A to D (FIG. 3), the output signals of the comparators 120 and 160 enable an AND circuit 200 consisting of AND elements. An output signal of the AND circuit 200 is input to an OR circuit 220. If the OR circuit 220 receives an output signal from any of the AND elements of the AND circuit 200, it outputs a signal to the main controller 20. The main controller 20 processes the output signal from the auxiliary acceleration sensor device 40 in connection with the output signal of the main acceleration sensor 30, and controls the operation of the air bag in accordance with the result of the processing.

Figure 5:
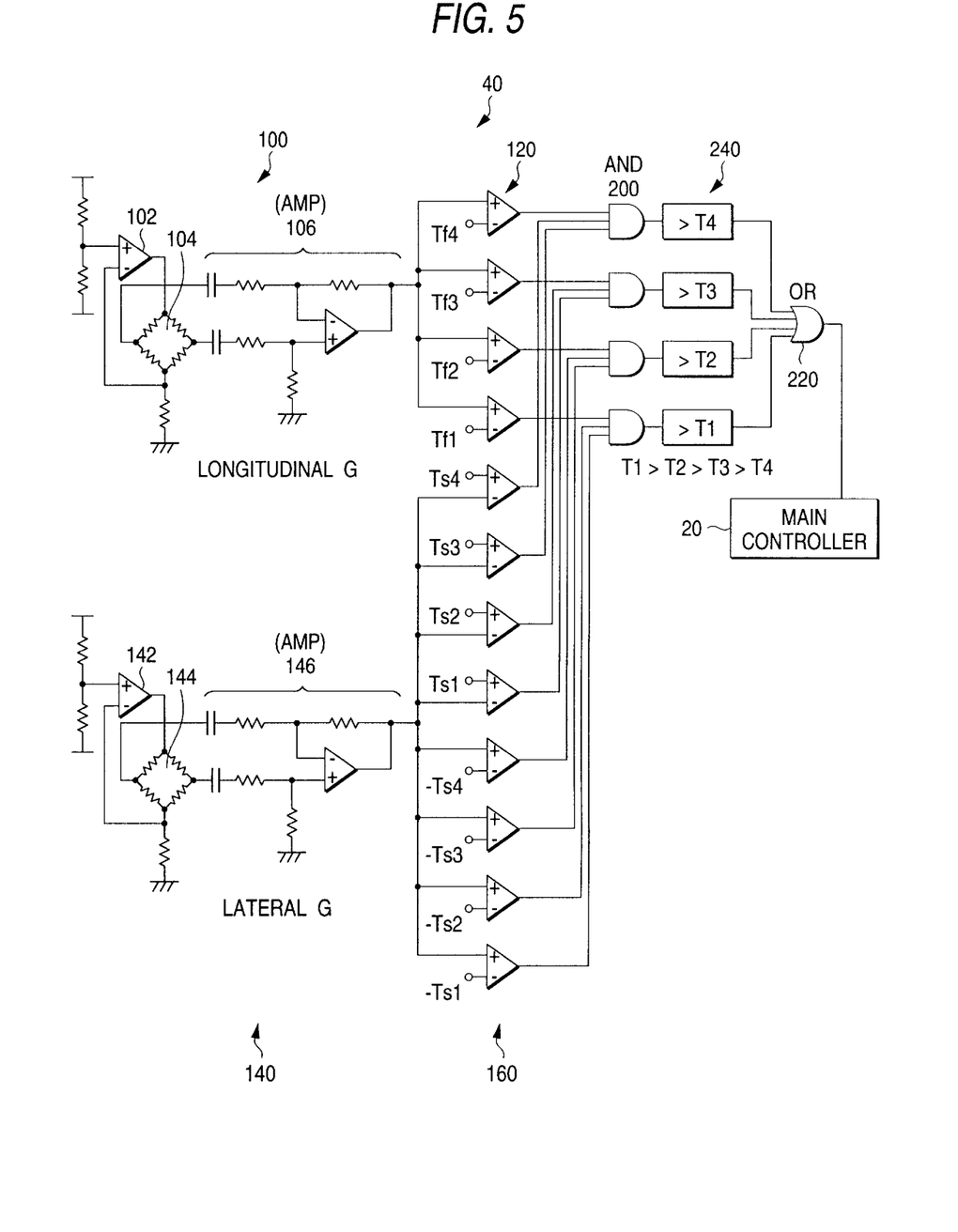
FIG. 5 is a circuit diagram showing an auxiliary acceleration sensor device as an electrical implementation of another embodiment of the present invention.

FIG. 5 is a circuit diagram showing an auxiliary acceleration sensor device as an electrical implementation of another embodiment of the present invention. The circuit arrangement of the auxiliary acceleration sensor device shown in FIG. 5 corresponds to the FIG. 4 circuit arrangement modified such that timer 240, consisting of timer elements, is inserted between the AND circuit 200 and the OR circuit 220. The timer elements of the timer 240 have different timer periods selected in accordance with the output signals of the AND circuits 200. The timer 240 operates such that for an acceleration signal of the smallest acceleration area A (FIG. 3), the timer 240 permits an output signal of the AND circuit 200 to go to the OR circuit 220 only when the duration of the output signal of the AND circuit 200 is long, and that for an acceleration signal of the largest acceleration area D (FIG. 3), the timer 240 permits an output signal of the AND circuit 200 to go to the OR circuit 220 even when the duration of the output signal of the AND circuit 200 is short. With provision of the timer 240, the auxiliary acceleration sensor device more accurately detects the necessity of inflating the air bag while eliminating noise.

Figure 6:
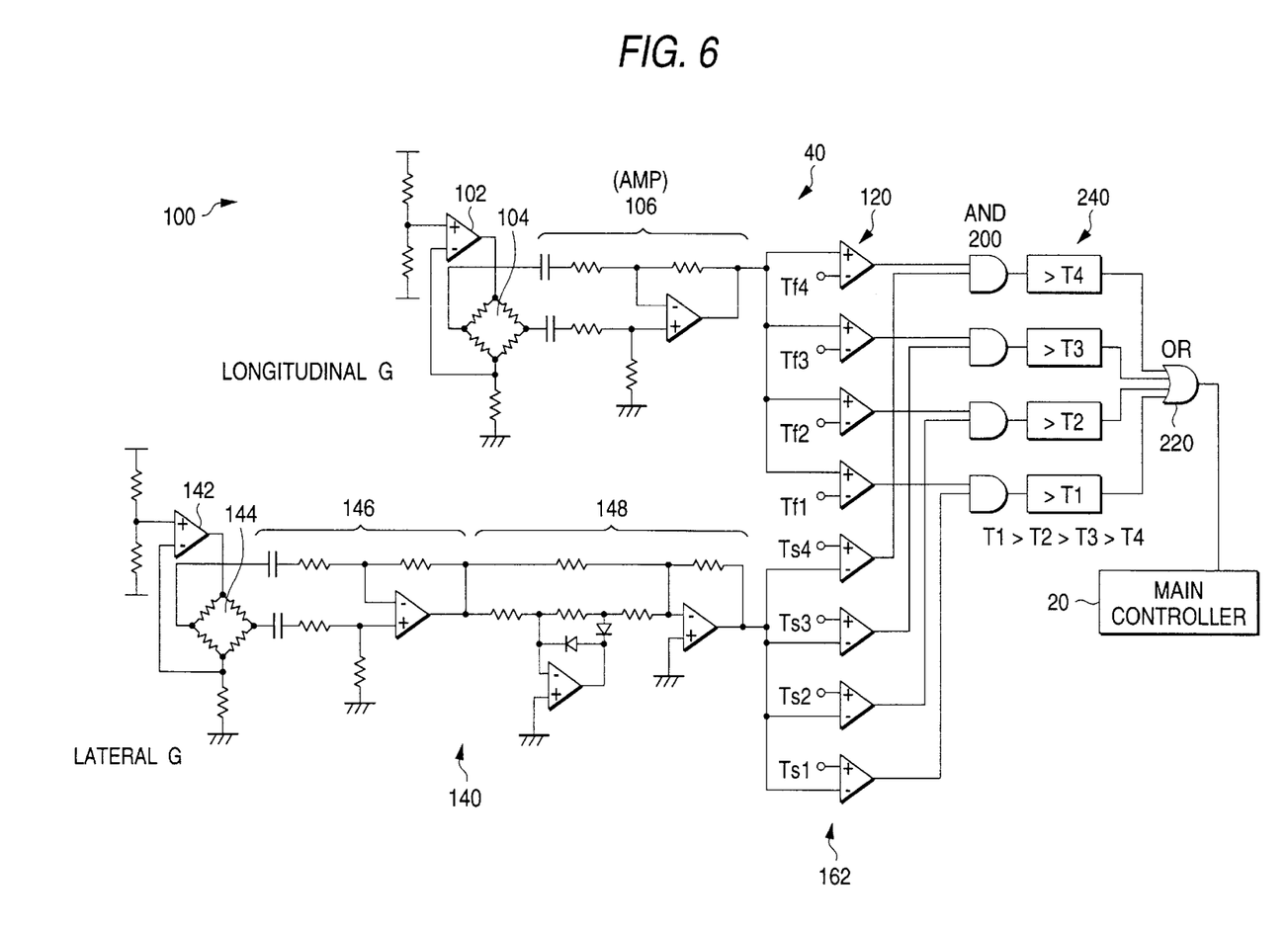
FIG. 6 is a circuit diagram showing an auxiliary acceleration sensor device as still another electrical implementation of yet another embodiment of the present invention.

FIG. 6 is a circuit diagram showing an auxiliary acceleration sensor device as an electrical implementation of yet another embodiment of the present invention. In the circuit arrangement of the auxiliary acceleration sensor device 40, the longitudinal G sensor 100 and the comparator 120 coupled for reception with the sensor 100 are the same as in the circuit arrangement already mentioned. In the lateral G sensor 140, an output signal of the amplifier portion 146 is input to an absolute circuit 148 for processing the received signal voltage to convert it into an absolute signal representative of a positive absolute value. The lateral acceleration G is sensed in the form of positive and negative voltage values. In the FIGS. 4 and 5 circuitry, the lateral threshold values of the areas A to D (FIG. 3) must be defined to be positive and negative. In the FIG. 6 circuitry, those threshold values are converted into voltages the polarity of which are only positive. Because of this, comparator 162 may be simplified in circuit construction. The output signal of the comparator 120 or 162 is transferred to the AND circuit 200, the timer 240 and the OR circuit 220, and finally to the main controller 20.

Figure 7:
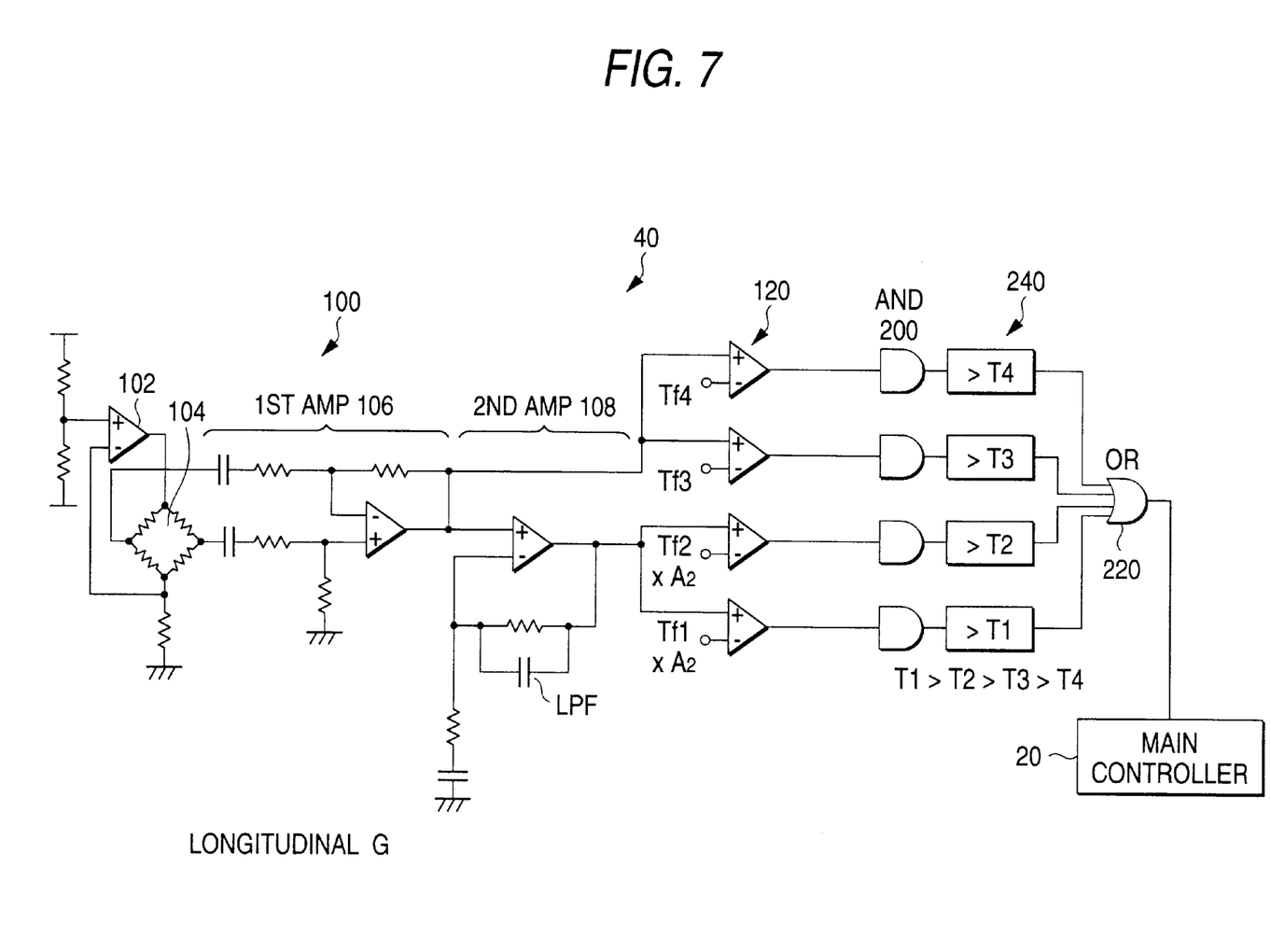
FIG. 7 is a circuit diagram showing an auxiliary acceleration sensor device as yet another electrical implementation of another embodiment of the present invention.

FIG. 7 is a circuit diagram showing an auxiliary acceleration sensor device as an electrical implementation of another embodiment of the present invention. In FIG. 7, only the longitudinal G sensor 100 followed by a signal processing system for processing an output signal of the sensor element is illustrated for simplicity of explanation. The lateral G sensor 140 followed by its signal processing system is not illustrated since the circuit arrangement thereof is substantially the same as that of the longitudinal G sensor 100 and its signal processing system. Two stages of amplifier portions, a first amplifier portion 106 and a second amplifier portion 108, are provided in the auxiliary acceleration sensor device 40 illustrated. The first amplifier portion 106 amplifies an output signal of the detector portion 104, and the second amplifier portion 108 amplifies an output signal of the first amplifier portion 106.

Lateral acceleration G, which can be detected by the auxiliary acceleration sensor device, ranges from approximately 30 G to approximately 1000 G. Therefore, the following problem arises: if the longitudinal threshold values (voltages) Tf1 and Tf2 for small G are selected with reference to the longitudinal threshold values Tf3 and Tf4 for large G, the longitudinal threshold values Tf1 and Tf2 are too small to eliminate noise.

To cope with this, the FIG. 7 circuitry is arranged such that before input to the comparator means 120, the high G area signal is amplified by the first amplifier portion 106, and the low G area signal is amplified by the two amplifier portions 106 and 108. In such a circuit arrangement, the low G area threshold voltages are amplified to be Tf1×A2 and Tf2×A2 (A2: amplification factor of the second amplifier portion 108). Further, a low-pass filter (capacitor) is coupled to the second amplifier portion 108. With this, noise of the sensing signals of the low G areas can be reduced without impairing a response rate of the high G area sensing signal in the circuitry.

Figure 8:
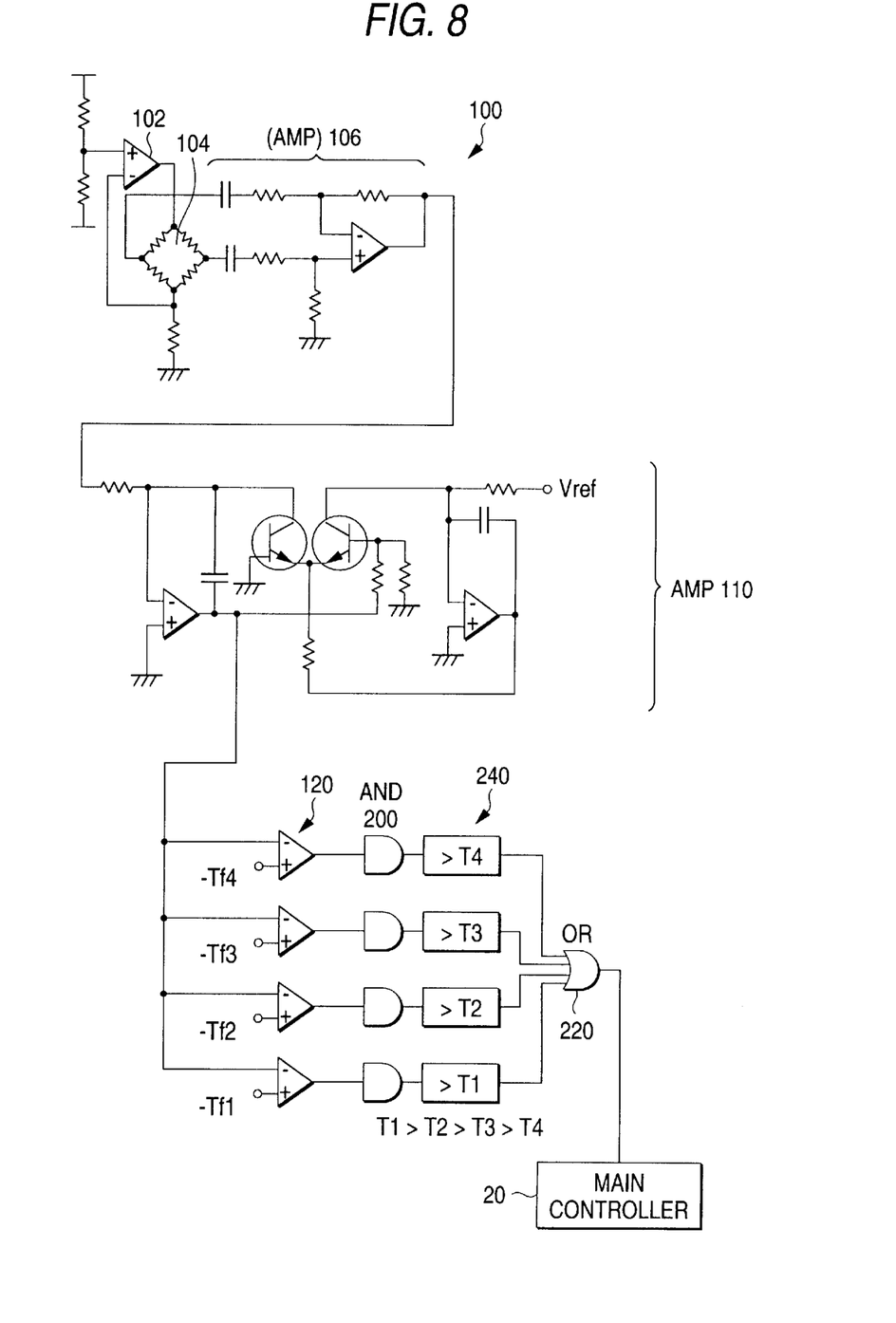
FIG. 8 is a circuit diagram showing an auxiliary acceleration sensor device as a further electrical implementation of another embodiment of the present invention.

FIG. 8 is a circuit diagram showing an auxiliary acceleration sensor device as an electrical implementation of another embodiment of the present invention. In FIG. 8, only the longitudinal G sensor 100 followed by a signal processing system for processing an output signal of the sensor element is representatively illustrated for simplicity of explanation. The lateral G sensor 140 followed by its signal processing system is not illustrated since the circuit arrangement thereof is substantially the same as of the longitudinal G sensor 100 and its signal processing system. The output of the FIG. 8 circuitry is coupled for transfer to the AND circuit 200.

As shown, the longitudinal G sensor 100 includes a power source circuit 102, a detector portion 104 and an amplifier portion 106. The output of the amplifier portion 106 is coupled for transfer to a logarithmic amplifier circuit 110. The logarithmic amplifier circuit 110 produces an output signal as a logarithmic function of the input signal. The output signal of the logarithmic amplifier circuit 110 is output to the comparator 120 where it is compared with the longitudinal threshold voltage values −Tf1 to −Tf4. Thus, the output signals of the logarithmic amplifier circuit 110 are logarithmic values. Because of this, the FIG. 8 circuit arrangement is able to detect G values with high precision even if the G values are dispersed over a broad range from approximately 30 G to 1000 G or larger. The output signal of the comparator 120 is output to the AND circuit 200, and added to the output signal of the lateral G sensor 140. The output signal of the AND circuit 200 is output to the main controller 20, through the AND circuit 200 and the OR circuit 220.

Figure 9:
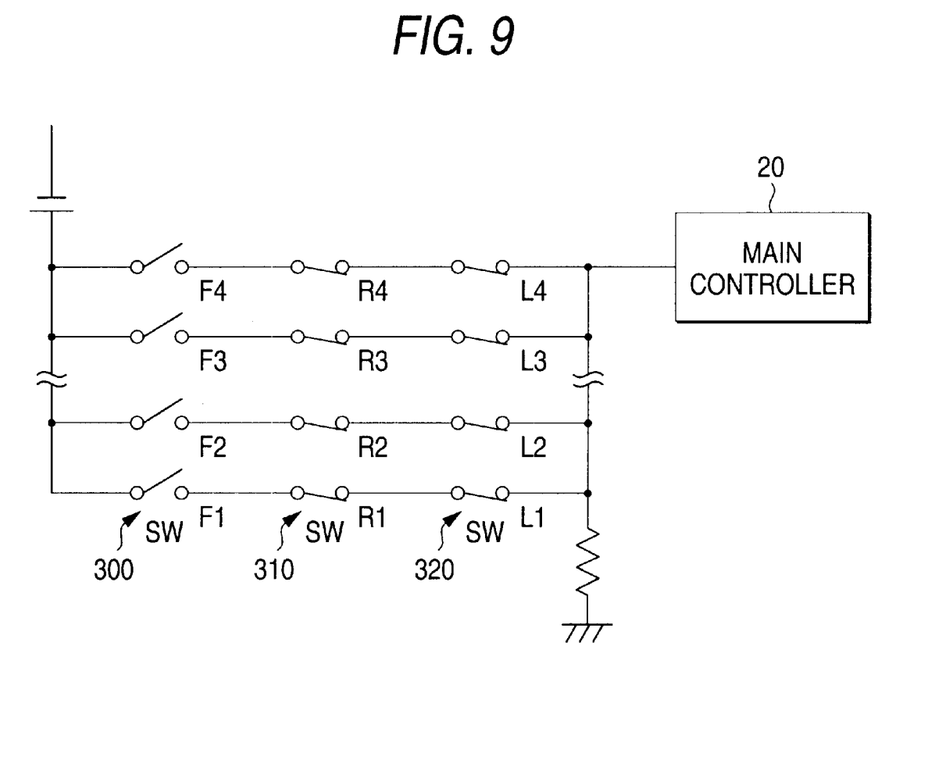
FIG. 9 is a circuit diagram showing a key portion of an auxiliary acceleration sensor device as an additional electrical implementation of another embodiment of the present invention.

FIG. 9 is a circuit diagram showing an auxiliary acceleration sensor device as an electrical additional implementation of another embodiment of the present invention. As shown, the auxiliary acceleration sensor device of FIG. 9 includes longitudinal switch 300 for detecting a longitudinal acceleration, right switch 310 for detecting an acceleration of the vehicle when an impact is applied to the right side of the vehicle, and left switch 320 for detecting an acceleration of the vehicle when an impact is applied to the left side of the vehicle. Those switches are connected in series.

More specifically, the longitudinal switch 300 includes a first mechanical switching element to be turned on when it receives an acceleration F1 of the area A, a second mechanical switching element to be turned on when it receives an acceleration F2 of the area B, a third switching element to be turned on when it receives an acceleration F3 of the area C, and a fourth switching element to be turned on when it receives an acceleration F4 of the area D. The right switch 310 is turned off when an acceleration caused by the rightward impact applied to the vehicle is in excess of the threshold value of each acceleration area. The left switch 320 is turned off when an acceleration caused by the leftward impact applied to the vehicle is in excess of the threshold value of each acceleration area. Thus, the auxiliary acceleration sensor device is constructed with only groups of the mechanically operable switching elements.

The auxiliary acceleration sensor device may be constructed such that the switching elements are not operated until an acceleration continues for preset times by use of dampers appropriately provided in the operating portions. The micro-machining technique may be used as the semiconductor manufacturing technique for manufacturing those grouped switching elements. In this case, the auxiliary acceleration sensor device may be remarkably reduced in size if the switch groups are formed in one substrate.

Figure 10A:
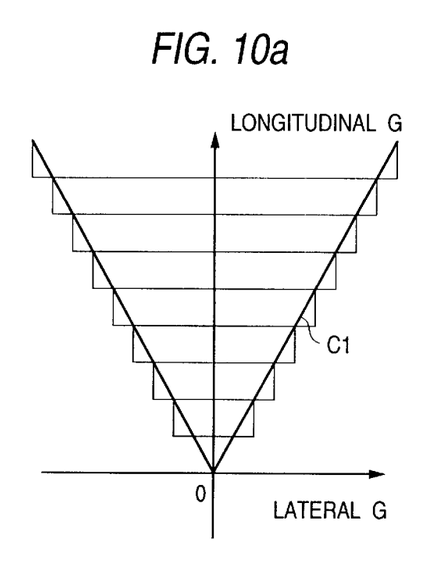
FIGS. 10A–C are explanatory diagrams showing some patterns of acceleration discriminating areas used for discriminating an acceleration of the vehicle when it receives an impact.
Figure 10B:
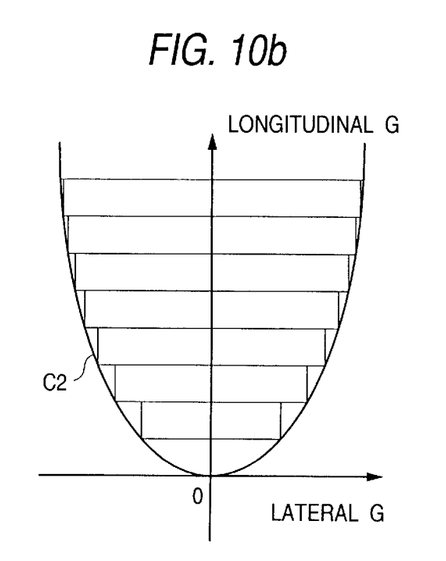
Figure 10C:
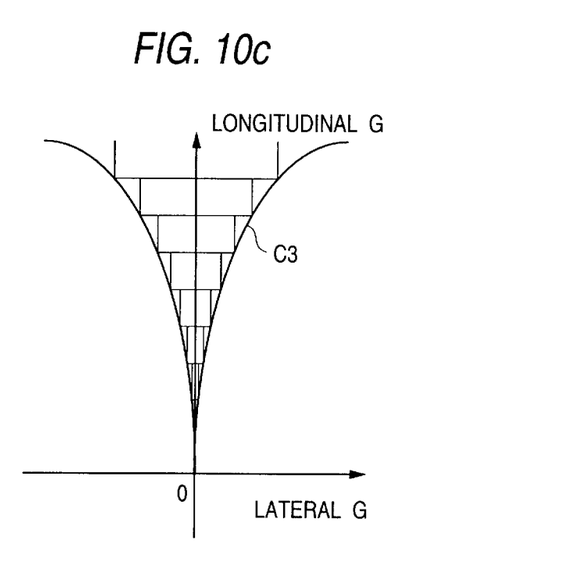

FIGS. 10A–10C show some typical patterns of acceleration discriminating areas used for discriminating an acceleration of the vehicle when it receives an impact. Those patterns may be used for operating the auxiliary acceleration sensor device of the invention. Those patterns may be formed by appropriately changing the longitudinal threshold value Tf and the lateral threshold value Ts. An acceleration discriminating pattern C1 (FIG. 10*a*) is shaped like a "V" in which the longitudinal threshold value Tf linearly varies with respect to the lateral threshold value Ts. An acceleration discriminating pattern C2 (FIG. 10*b*), defined by a parabolic curve, is shaped like a "U". Where the pattern C2 is used, the auxiliary acceleration sensor device produces an output signal to inflate the air bag even when an impact is obliquely applied to the front of the vehicle at a large angle. An acceleration discriminating pattern C3 (FIG. 10*c*), defined by two exponential curves, also has a shape similar to a "V". Where the pattern C3 is used, the auxiliary acceleration sensor device produces an output signal to the main controller in a region of low lateral accelerations G only when an impact is input to the vehicle front in the longitudinal direction of the vehicle or in a direction slightly angularly deviated from the same.

As seen from the foregoing description, the auxiliary acceleration sensor device detects an acceleration, caused by an impact to the front of the vehicle, in two directions, a longitudinal direction and a lateral direction; compares an acceleration detected in the longitudinal direction with an acceleration detected in a lateral direction; and judges a direction and a magnitude (acceleration level) of the impact on the basis of the comparison. Then, the auxiliary acceleration sensor device produces an output signal at an optimal timing to the main controller of an air bag system. Therefore, even when the impact is obliquely applied to the front of the vehicle, the auxiliary acceleration sensor device prevents the air bag system from erroneously operating, and enables the air bag system to optimally cope with various types of impact applications. In the case where the auxiliary acceleration sensor device is of the electronic type, its response rate to an impact input to it is improved, it is efficiently manufactured, and further the size and weight of the resultant device are reduced.

What is claimed is:

1. An air bag system comprising:

a main controller that controls operation of an air bag;

a main acceleration sensor that senses an acceleration of a vehicle carrying the air bag system; and an auxiliary acceleration sensor device, located at a periphery of the vehicle, that senses an acceleration of the periphery of the vehicle, the auxiliary acceleration sensor device comprising:

a longitudinal sensor that senses a longitudinal acceleration of the vehicle and generates a longitudinal acceleration signal;

a lateral sensor that senses a lateral acceleration of the vehicle and generates a lateral acceleration signal;

a first set of comparators that compare the longitudinal acceleration signal with each of a first preselected set of acceleration values and generate a first set of comparator output signals, each of the first set of comparator output signals corresponding to one of the first preselected set of acceleration values;

a second set of comparators that compare the lateral acceleration signal with each of a second set of preselected values of acceleration and generate a second set of comparator output signals, each of the second set of comparator output signals corresponding to one of the second preselected set of acceleration values;

AND elements, each having an AND element output signal, the AND elements logically multiplying each output signal of the first set of comparator output signals with a related output signal of the second set of comparator output signals, wherein the first and second set of comparator output signals are related by increasing magnitudes of their respective preselected first and second sets of acceleration values; and an OR circuit that logically sums the AND element output signals and outputs a result to the main controller.

2. The air bag system according to claim 1, wherein the auxiliary acceleration sensor device further comprises a timer being associated with each AND element, the timer permitting the AND element output signal to be transmitted to the OR circuit only when a duration of the AND element output signal is longer than one of a set of preselected time periods, the preselected time periods being chosen to be relatively small for AND element output signals associated with relatively large values of the first and second sets of preselected acceleration values, and the preselected time periods being chosen to be relatively large for AND element output signals associated with relatively small values of the first and second sets of preselected acceleration values.

3. The air bag system according to claim 2, wherein the lateral acceleration signal is always a positive voltage and is generated by an absolute circuit that converts the sensed lateral acceleration into an absolute value represented by the positive voltage.

4. The air bag system according to claim 2, wherein at least one of the lateral sensor and the front-to-rear sensor includes a first amplifier that amplifies a detected signal representing the lateral acceleration of the vehicle, a second amplifier having a gain A2 and being driven by the first amplifier, the second amplifier outputting a signal to at least one of the set of first and second comparators that compare the output signal of the second amplifier to one preselected value of one of the first and second sets of preselected values scaled by a factor of the second amplifier gain A2.

5. The air bag system according to claim 2, wherein the lateral acceleration signal is logarithmic and is generated by a logarithmic amplifier circuit that converts the sensed lateral acceleration into a logarithmic value.

6. The air bag system according to claim 2, wherein the longitudinal acceleration signal is logarithmic and is generated by a logarithmic amplifier circuit that converts the sensed longitudinal acceleration into a logarithmic value.

7. An air bag system comprising:
a main controller for controlling an operation of an air bag;
a main acceleration sensor for sensing an acceleration of a vehicle carrying the air bag system; and
an auxiliary acceleration sensor device, located at a periphery of the vehicle, for sensing an acceleration of the periphery of the vehicle, the auxiliary acceleration sensor device comprising:
a plurality of series circuits connected in parallel, each series circuit comprising a longitudinal switch being closed when a detected acceleration reaches one of a first set of preselected acceleration values and
a lateral switch being opened when a detected acceleration reaches one of a second set of preselected acceleration values.

8. The air bag system according to claim 7, wherein the longitudinal switches and the lateral switches have damper functions.

9. The air bag system according to claim 7, wherein the series circuit, including the longitudinal switches and the lateral switches, is fabricated into a single substrate by a micro-machining process.

10. An air bag system, comprising:
a main controller for controlling the operation of the air bag;
a main acceleration sensor device for sensing an acceleration of a vehicle carrying the air bag system; and
an auxiliary acceleration sensor, located at a periphery of the vehicle, for sensing an acceleration of the periphery of the vehicle, the auxiliary sensor device comprising:
longitudinal sensor means for sensing a longitudinal acceleration of the vehicle, the longitudinal sensor means having an output;
lateral sensor means for sensing a lateral acceleration of the vehicle, the lateral sensor means having an output;
a first comparator means for determining if a sensed longitudinal acceleration is larger than a predetermined set of longitudinal acceleration values and generating a set of corresponding comparison output signals;
a second comparator means for determining if a sensed lateral acceleration is smaller than a predetermined set of lateral acceleration values and generating a corresponding set of output signals;
an AND circuit, having output signals and comprising a plurality of AND elements, for logically multiplying the output signals of the first comparator means and the second comparator means, wherein the multiplied output signals of the first and second set of comparator means are related by increasing magnitudes of their respective longitudinal and lateral acceleration values; and
an OR circuit for logically summing the output signals of the AND elements of the AND circuit and outputting a result to the main controller.

11. The air bag system according to claim 10, in which the auxiliary acceleration sensor device further comprises timer means being located between the AND elements and the OR circuit, the timer means permitting an output signal of the AND elements to be transmitted to the OR circuit only when the duration of the output signal of the AND element is longer than a preselected time period, wherein the preselected time period is inversely related to a magnitude of the longitudinal and lateral acceleration values corresponding to the AND element.

12. The air bag system according to claim 11, in which the lateral sensor means includes an absolute circuit for converting a detected signal into an absolute value signal, the detected signal being representative of the lateral acceleration, and the second comparator means compares the absolute value signal with a preset value.

13. The air bag system according to claim 11, in which at least the lateral sensor means includes first and second amplifiers for amplifying a detected signal, and amplifies an acceleration signal defining a relatively small acceleration area of the acceleration discriminating pattern by use of the first and second amplifiers.

14. The air bag system according to claim 11, in which at least the lateral sensor means includes a logarithmic amplifier circuit for logarithmically amplifying a detected signal representing the sensed lateral acceleration, and outputs, a logarithmic signal to the second comparator means.

15. The air bag system according to claim 11, in which at least the longitudinal sensor means includes a logarithmic amplifier circuit for logarithmically amplifying a detected signal representing the sensed longitudinal acceleration, and outputs a logarithmic signal to the first comparator means.

16. An air bag system comprising:
a main controller for controlling an operation of an air bag;
a main acceleration sensor for sensing an acceleration of a vehicle; and
an auxiliary acceleration sensor device, located at a periphery of the vehicle, for sensing an acceleration of the periphery of the vehicle, the auxiliary acceleration sensor device including:
a plurality of series circuits connected in parallel, each series circuit comprising longitudinal switching means being closed when a sensed acceleration reaches one of a first set of preselected acceleration values and lateral switching means being opened when a sensed acceleration reaches one of a second set of preselected acceleration values.

17. The air bag system according to claim 16, in which the longitudinal switching means and the lateral switching means have damper functions.

18. The air bag system according to claim 16, in which the circuit including the longitudinal switching means and the lateral switching means are formed in a single substrate.

\* \* \* \* \*